United States Patent
Ma et al.

(10) Patent No.: US 10,186,327 B1
(45) Date of Patent: Jan. 22, 2019

(54) SELF-TRACKED BISTABLE LATCH CELL

(71) Applicant: iMQ Technology Inc., Hsinchu (TW)

(72) Inventors: Tangkwai Ma, Plano, TX (US);
Fu-Yang Shih, Hsinchu County (TW)

(73) Assignee: iMQ Technology Inc., Hsinchu (TW)

( * ) Notice: Subject to any disclaimer, the term of this patent is extended or adjusted under 35 U.S.C. 154(b) by 0 days.

(21) Appl. No.: 15/893,688

(22) Filed: Feb. 11, 2018

Related U.S. Application Data (60) Provisional application No. 62/583,508, filed on Nov. 9, 2017.

(51) Int. Cl.
| | |
|---|---|
| *G11C 11/412* | (2006.01) |
| *G11C 17/18* | (2006.01) |
| *G06F 21/75* | (2013.01) |
| *H04L 9/32* | (2006.01) |
| *G11C 17/16* | (2006.01) |

(52) U.S. Cl.
CPC .............. *G11C 17/18* (2013.01); *G06F 21/75* (2013.01); *G11C 11/412* (2013.01); *G11C 17/165* (2013.01); *H04L 9/3278* (2013.01)

(58) Field of Classification Search
CPC .................................................. G11C 11/412
USPC .......................................................... 365/156
See application file for complete search history.

(56) References Cited

U.S. PATENT DOCUMENTS

| | | | | | |
|---|---|---|---|---|---|
| 5,523,971 | A | * | 6/1996 | Rao .................... | G11C 16/0441 365/154 |
| 5,648,930 | A | * | 7/1997 | Randazzo .............. | G11C 14/00 365/154 |
| 5,724,294 | A | * | 3/1998 | Khieu ...................... | G11C 7/06 365/190 |
| 5,856,941 | A | * | 1/1999 | Keyse ................ | G11C 16/0441 365/154 |
| 6,038,168 | A | * | 3/2000 | Allen ..................... | G11C 17/16 365/154 |
| 6,639,827 | B2 | * | 10/2003 | Clark ..................... | G11C 14/00 365/154 |
| 9,672,935 | B2 | * | 6/2017 | Cline ..................... | G11C 17/16 |

* cited by examiner

*Primary Examiner* — Son Mai
(74) *Attorney, Agent, or Firm* — Winston Hsu (57) ABSTRACT

A self-tracked bistable latch cell includes a cross-coupled latch, and two programmable transistors. The cross-coupled latch has a first data terminal, a second data terminal, a first voltage input terminal for receiving a latch control signal, and a second voltage input terminal for receiving a reference voltage. The first programmable transistor has a first terminal for outputting a first bit, a second terminal coupled to the first data terminal of the cross-coupled latch, and a control terminal for receiving a track control signal. The second programmable transistor has a first terminal for outputting a second bit, a second terminal coupled to the second data terminal of the cross-coupled latch, and a control terminal for receiving the track control signal. The gate oxide of both the first and the second programmable transistor are thinner than the gate oxide of the transistor of the cross-coupled latch.

20 Claims, 8 Drawing Sheets

SELF-TRACKED BISTABLE LATCH CELL

CROSS REFERENCE TO RELATED APPLICATIONS

This non-provisional application claims priority of US provisional application US 62/583,508, filed on Nov. 9, 2017, included herein by reference in its entirety.

BACKGROUND OF THE INVENTION

1. Field of the Invention

This invention relates to a bistable latch cell, and more particularly, a bistable latch cell capable of tracking its initial state.

2. Description of the Prior Art

A latch cell is a basic storage element that can be constructed with two cross-coupled inverters. When powered up, the circuit will be in an undefined state for an indefinite period, but eventually the output voltages of the two inverters will settle to a stable state opposite to each other due to uncontrollable manufacturing process variations. To be more specific, the inverter succeeds in stabilizing first to a state will feedback to the other toward the opposite state, and finally the latch cell will remain at the stable state and store the initialized value. That is, the latch cell can be deemed as a bistable memory cell that remembers its initial state after first power up. However, it is impossible to predict which inverter would dominate in a particular latch cell.

Due to the uniqueness of bistable latch's physical microstructure, the latch cell can be applied for the physical unclonable functions (PUF). While adequate randomness and unpredictability are achievable for most PUF implementations, achieving high reliability is difficult and costly. Since the bit may flip due to the entropy source changes when temperature, voltage, ambient noise, and other environmental change in device operation, or simply due to device aging, the initial state of the latch cell is difficult to be preserved or reproduced. Therefore, in prior art, error-tolerant mechanisms, helper data built into the PUF, and the corresponding enrollment process are required to improve reproducibility. However, the helper data and error correction algorithms can bring significant overhead and cause security vulnerability to the system.

SUMMARY OF THE INVENTION

One embodiment of the present invention discloses a self-tracked bistable latch cell. The self-tracked bistable latch cell includes a cross-coupled latch, a first programmable transistor, and a second programmable transistor.

The cross-coupled latch has a first data terminal, a second data terminal, a first voltage input terminal configured to receive a latch control signal, and a second voltage input terminal configured to receive a reference voltage.

The first programmable transistor has a first terminal configured to output a first bit during a read operation, a second terminal coupled to the first data terminal of the cross-coupled latch, and a control terminal configured to receive a track control signal. A gate oxide of the first programmable transistor is thinner than a gate oxide of a transistor of the cross-coupled latch.

The second programmable transistor has a first terminal configured to output a second bit during the read operation, a second terminal coupled to the second data terminal of the cross-coupled latch, and a control terminal configured to receive the track control signal. A gate oxide of the second programmable transistor is thinner than the gate oxide of the transistor of the cross-coupled latch.

Another embodiment of the present invention discloses a method for operating a self-tracked bistable latch cell. The self-tracked bistable latch cell includes a cross-coupled latch, a first programmable transistor coupled to a first data terminal of the cross-coupled latch, and a second programmable transistor coupled to a second data terminal of the cross-coupled latch. The method includes providing a latch control signal to the cross-coupled latch to activate the cross-coupled latch during a track operation, the cross-coupled latch entering a stable state to output a complementary pair of bits through the first data terminal and the second data terminal according to natural tendency of the cross-coupled latch caused by uncontrollable manufacturing processes, and providing a track control signal to a control terminal of the first programmable transistor and a control terminal of the second programmable transistor so as to rupture one of the first programmable transistor and the second programmable transistor according to the complementary pair of bits.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
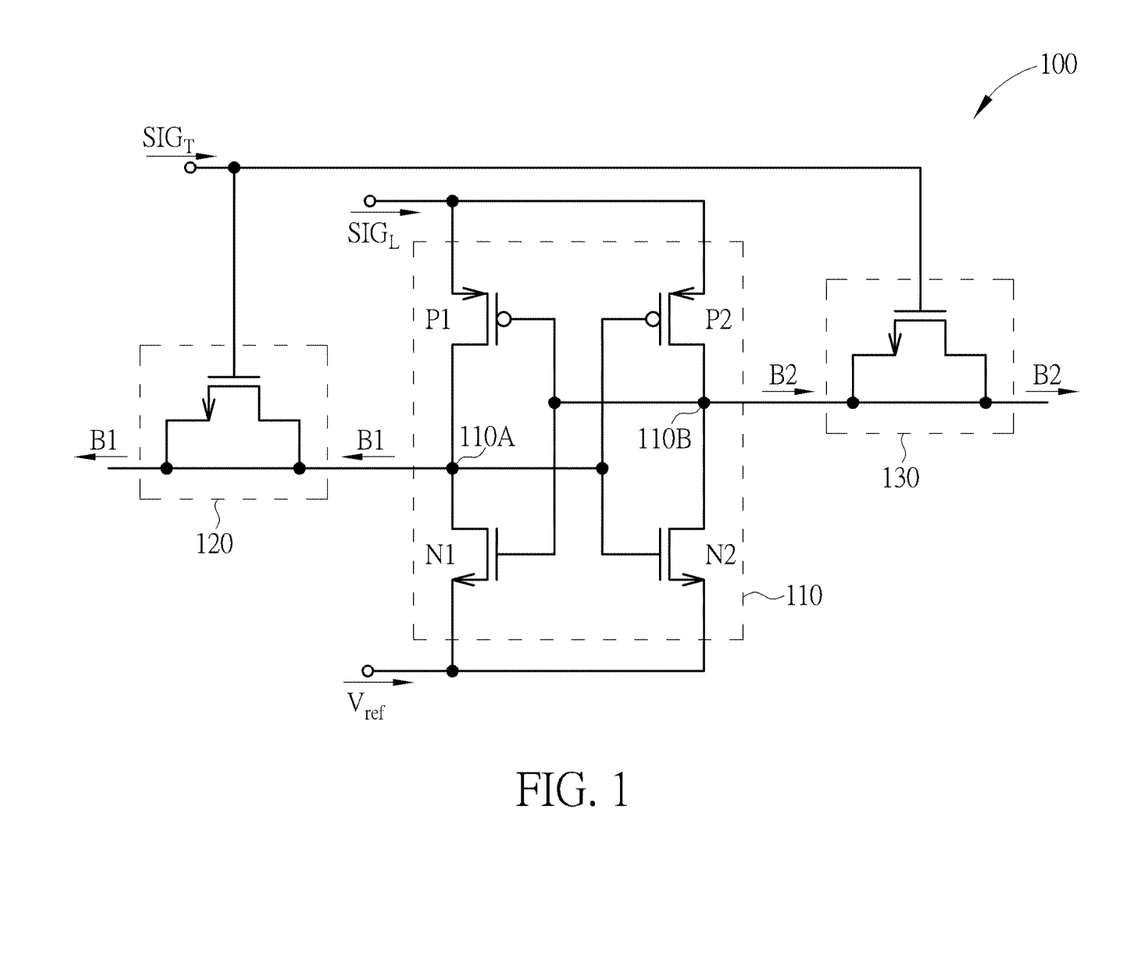
FIG. 1 shows a self-tracked bistable latch cell according to one embodiment of the present invention.

FIG. 1 shows a self-tracked bistable latch cell 100 according to one embodiment of the present invention. The self-tracked bistable latch cell 100 includes a cross-coupled latch 110, a first programmable transistor 120, and a second programmable transistor 130.

The cross-coupled latch 110 has a first data terminal 110A, a second data terminal 110B, a first voltage input terminal for receiving a latch control signal $SIG_L$, and a second voltage input terminal for receiving a reference voltage $V_{ref}$. The reference voltage $V_{ref}$ can be, for example, the ground voltage of the system. In FIG. 1, the cross-coupled latch 110 includes a first P-type transistor P1, a second P-type transistor P2, a first N-type transistor N1, and a second N-type transistor N2.

The first P-type transistor P1 has a first terminal coupled to the first voltage input terminal of the cross-coupled latch 110, a second terminal coupled to the first data terminal 110A of the cross-coupled latch 110, and a control terminal coupled to the second data terminal 110B of the cross-coupled latch 110. The second P-type transistor P2 has a first terminal coupled to the first voltage input terminal of the cross-coupled latch 110, a second terminal coupled to the second data terminal 110B of the cross-coupled latch 110, and a control terminal coupled to the first data terminal 110A of the cross-coupled latch 110. The first N-type transistor N1 has a first terminal coupled to the first data terminal 110A of the cross-coupled latch 110, a second terminal coupled to the second voltage input terminal of the cross-coupled latch 110, and a control terminal coupled to the second data terminal 110B of the cross-coupled latch 110. The second N-type transistor N2 has a first terminal coupled to the second data terminal 110B of the cross-coupled latch 110, a second terminal coupled to the second voltage input terminal of the cross-coupled latch 110, and a control terminal coupled to the first data terminal 110A of the cross-coupled latch 110.

The first programmable transistor 120 has a first terminal for outputting a first bit B1 during a read operation, a second terminal coupled to the first data terminal 110A of the cross-coupled latch 110, and a control terminal for receiving a track control signal $SIG_T$. The second programmable transistor 130 has a first terminal for outputting a second bit B2 during the read operation, a second terminal coupled to the second data terminal 110B of the cross-coupled latch 110, and a control terminal for receiving the track control signal $SIG_T$. In FIG. 1, the second terminal of the first programmable transistor 120 can be coupled to the first terminal of the first programmable transistor 120, and the second terminal of the second programmable transistor 130 can be coupled to the first terminal of the third programmable transistor 130.

Also, the gate oxide of the first programmable transistor 120 can be thinner than the gate oxide of any transistor of the cross-coupled latch 110, and the gate oxide of the second programmable transistor 130 can be thinner than the gate oxide of any transistor of the cross-coupled latch 110. Since the gate oxides of the first programmable transistor 120 and the second programmable transistor 130 are thinner, the first programmable transistor 120 and the second programmable transistor 130 can be ruptured under high voltages, and thus, can be used to record the initial state of the cross-coupled latch 110. In some embodiments, the first programmable transistor 120 and the second programmable transistor 130 can be anti-fuse transistors.

During a track operation of the self-tracked bistable latch cell 100, the cross-coupled latch 110 would enter a stable state and output a complementary pair of bits B1 and B2 respectively through the first data terminal 110A and the second data terminal 110B according to the natural tendency of the cross-coupled latch 110 caused by uncontrollable manufacturing processes. In this case, the first programmable transistor 120 and the second programmable transistor 130 will receive different voltages. By setting the signal voltages properly, one of the first programmable transistor 120 and the second programmable transistor 130 would be ruptured according to the complementary pair of bits B1 and B2. Therefore, the complementary pair of bits B1 and B2 generated by the cross-coupled latch 110 at the first power up will be tracked by the conditions of the first programmable transistor 120 and the second programmable transistor 130.

Figure 2:
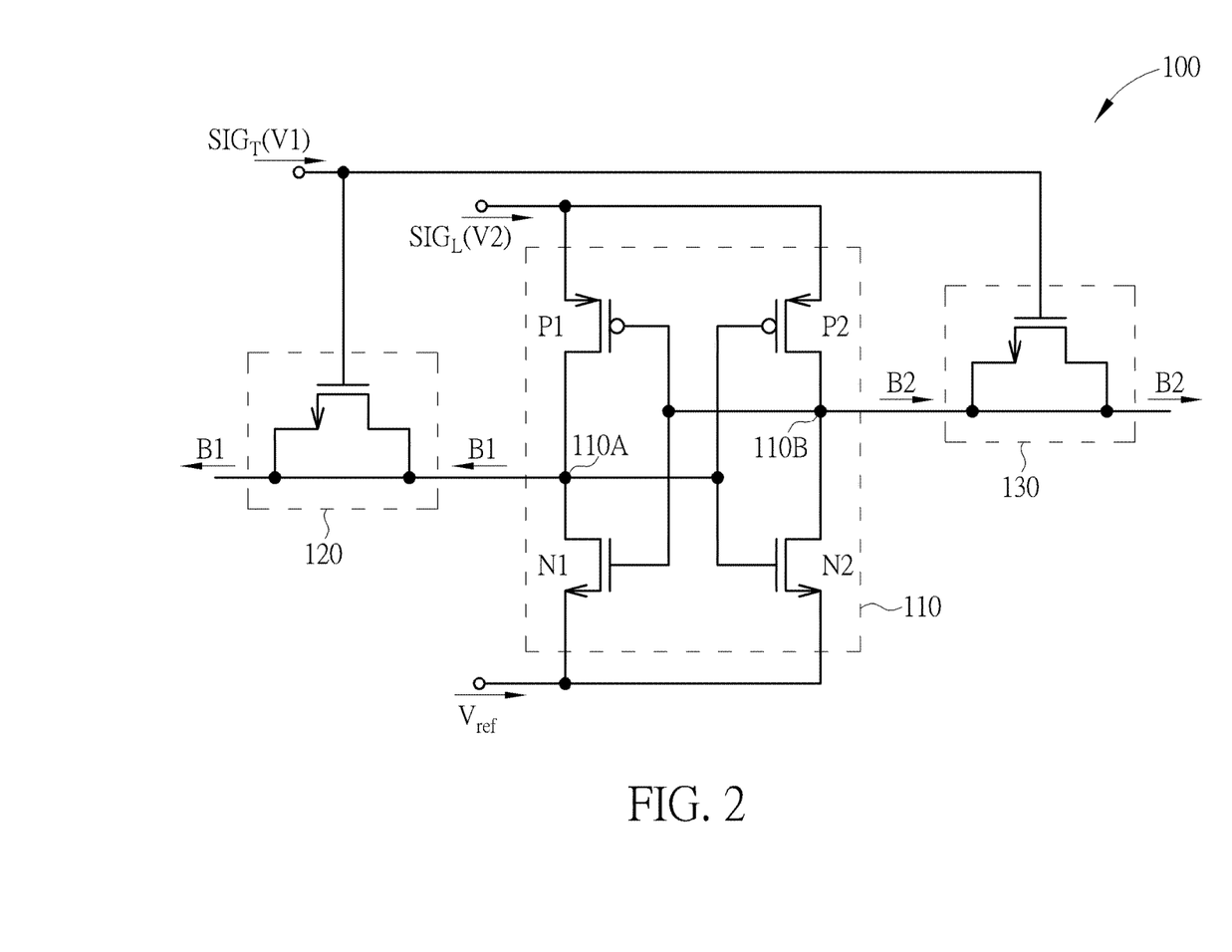
FIG. 2 shows voltages of the control signals applied to the self-tracked bistable latch cell in FIG. 1 during the track operation.

FIG. 2 shows voltages of the control signals applied to the self-tracked bistable latch cell 100 during a track operation according to one embodiment of the present invention. In FIG. 2, the track control signal $SIG_T$ is at a first voltage V1, and the latch control signal $SIG_L$ is at a second voltage V2 higher than the first voltage V1. In some embodiments of the present invention, the voltage difference between the second voltage V2 and the first voltage V1 is large enough to rupture the first programmable transistor 120 and the second programmable transistor 130. Also, in some embodiments, the first voltage V1 can be substantially equal to the reference voltage $V_{ref}$.

In this case, if the cross-coupled latch 110 finally settles with the bit B1 to be "1" and the bit B2 to be "0", then the second terminal of the first programmable transistor 120 would receive the second voltage V2 while the second terminal of the second programmable transistor 130 would receive the reference voltage $V_{ref}$. Since the control terminals of the first programmable transistor 120 and the second programmable transistor 130 both receive the track control signal $SIG_T$ at the first voltage V1, the large potential (V1 to V2) across the gate area of the first programmable transistor 120 will cause a degree of breakdown on the gate oxide while the potential (V1 to $V_{ref}$) across the gate area of the second programmable transistor 130 would not cause significant effects.

Likewise, if the cross-coupled latch 110 finally settles and outputs the bit B1 to be "0" and the bit B2 to be "1", then the second programmable transistor 130 would suffer a large voltage stress and cause gate oxide to break down while the first programmable transistor 120 would not be affected.

Since the first programmable transistor 120 and the second programmable transistor 130 will have different gate oxide conditions corresponding to the settled complementary pair of bits B1 and B2, the conditions of the first programmable transistor 120 and the second programmable transistor 130 can be used to track the initial state of the cross-coupled latch 110.

In some embodiments, the track operation is performed as part of the initial device power-on procedures; therefore, the initial state of the cross-coupled latch 110 can be stored accordingly. Also, the degrees of rupture to the programmable transistors 120 and 130 are proportional to the potential voltage over their gate oxides, which is controllable by adjusting the latch control signal $SIG_L$ and the track control signal $SIG_T$ according to device fabrication feature parameters and/or duration of the stress condition. The marginality can be scaled against potential impact due to maximum environmental variations in device normal operations and aging.

Figure 3:
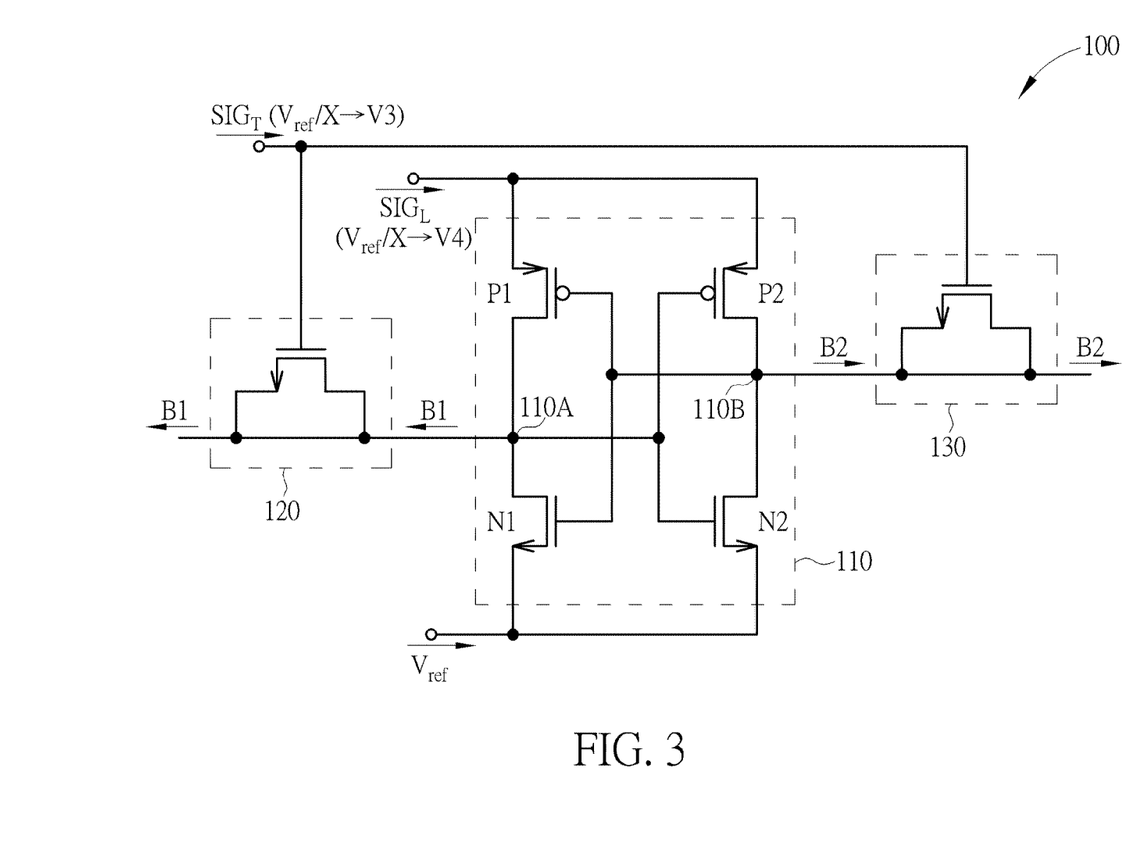
FIG. 3 shows voltages of the control signals applied to the self-tracked bistable latch cell in FIG. 1 during the read operation.

After the initial state has been tracked, the tracked state can be read according to the conditions of the first programmable transistor 120 and the second programmable transistor 130 in a read operation. FIG. 3 shows the voltages of the control signals applied to the self-tracked bistable latch cell 100 during the read operation according to one embodiment of the present invention.

During the read operation, the latch control signal $SIG_L$ and the track control signal $SIG_T$ are at the reference voltage $V_{ref}$ or floating (denoted by "X" in FIG. 3) firstly. Then, the track control signal $SIG_T$ is changed to a third voltage V3, and the latch control signal $SIG_L$ is changed to a fourth voltage V4 after the track control signal $SIG_T$ is changed to the third voltage V3. In some embodiments, the third voltage V3 and the fourth voltage V4 are higher than the reference voltage $V_{ref}$, and the third voltage V3 can be substantially equal to the fourth voltage V4.

In this case, the early raised track control signal $SIG_T$ can activate the first programmable transistor 120 and the second programmable transistor 130 to enhance the voltage differentiation between data terminals 110A and 110B due to the different gate oxide conditions corresponding to their initial states of the bits B1 and B2. Therefore, later when the latch control signal $SIG_L$ is pulled up to the fourth voltage V4, the voltage differentiation enhanced by the first programmable transistor 120 and the second programmable transistor 130 will lead the latch state to be the same as the initial state. Consequently, the states of the bits B1 and B2 settled initially in the self-tracked bistable latch cell 100 during the tracking operation can be read out again accordingly during the read operation.

Since the cross-coupled latch 110 can be stabilized by the latch control signal $SIG_L$ at the fourth voltage V4, the read operation can be accomplished in a rather stable environment with a larger differential sensing voltage to complete the read access.

In addition, since the second voltage V2 used for the track operation is designated to rupture a device's physical layer, the second voltage V2 can be higher than the third voltage V3 and the fourth voltage V4 used for read operations. However, the specific voltage level for track operations and read operations can be defined depending on a particular semiconductor technology being used.

Furthermore, the self-tracked bistable latch cell 100 is also capable of self-destruction. This can be very valuable for security systems supporting cryptographic applications. Since the PUF device usually contains highly sensitive information in a security system, it is desirable to have a built-in mechanism that is responsive to threats induced by tampering or other unauthorized operations.

Figure 4:
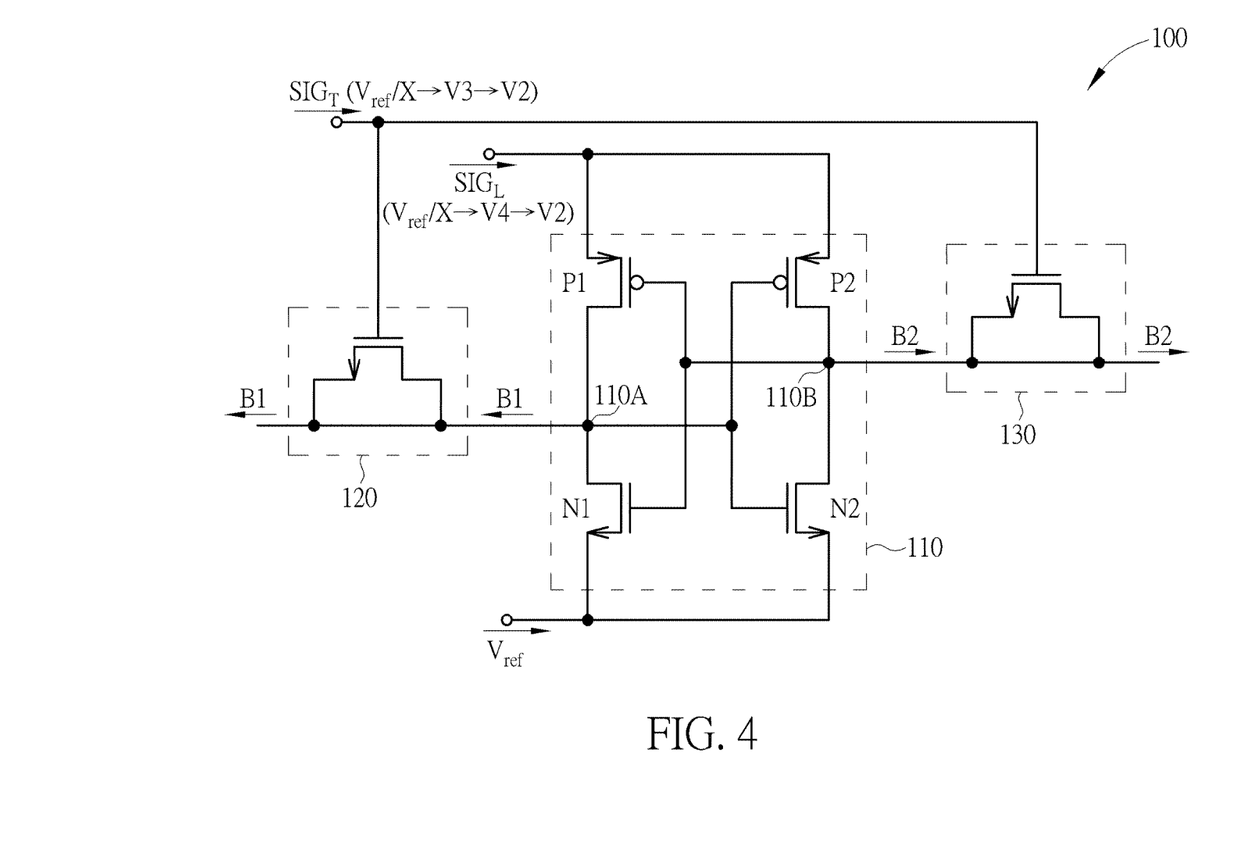
FIG. 4 shows voltages of the control signals applied to the self-tracked bistable latch cell in FIG. 1 during the self-destruction operation.

When an attack or unauthorized operation is detected, the self-tracked bistable latch cell 100 can perform a self-destruction operation to remove the cell data. FIG. 4 shows the voltages of the control signals applied to the self-tracked bistable latch cell 100 during the self-destruction operation according to one embodiment of the present invention.

During the self-destruction operation, the bits B1 and B2 can be read out from the cross-coupled latch 110 first. Therefore, the similar movements shown in the read operation can be applied. That is, the latch control signal $SIG_L$ and the track control signal $SIG_T$ can be at the reference voltage $V_{ref}$ or floating (denoted by "X" in FIG. 4) first. Then, the track control signal $SIG_T$ is changed to a third voltage V3, and the latch control signal $SIG_L$ is changed to a fourth voltage V4 after the track control signal $SIG_T$ is changed to the third voltage V3. Afterwards, when the cross-coupled latch 110 enters the stable state and outputs the bits B1 and B2 recorded initially, the latch control signal $SIG_L$ and the track control signal $SIG_T$ can be changed to the second voltage V2. In some embodiments, the latch control signal $SIG_L$ may be changed to the second voltage V2 directly after the track control signal $SIG_T$ is changed to the third voltage V3 without being adjusted to the fourth voltage V4 first while the track control signal $SIG_T$ is changed to the second voltage V2 later.

In this case, if the initial data stored in the cross-coupled latch 110 has the bit B1 to be "1" and bit B2 to be "0", then the gate oxide of the first programmable transistor 120 would have been weakened previously while the gate oxide of the second programmable transistor 130 may remain intact due to the initial track operation. However, during the self-destruction operation, the second terminal of the second programmable transistor 130 would receive the reference voltage $V_{ref}$ from the second data terminal 110B of the cross-coupled latch 110, and the control terminal of the second programmable transistor 130 would receive the second voltage V2. Therefore, the large voltage potential between the second voltage V2 and the reference voltage $V_{ref}$ applied to the second programmable transistor 130 will also rupture the gate oxide of the second programmable transistor 130. However, since the second terminal and the control terminal of the first programmable transistor 120 would both receive the second voltage V2, the self-destruction operation will not affect the first programmable transistor 120 in this case.

That is, after the self-destruction operation is performed, both the first programmable transistor 120 and the second programmable transistor 130 will be ruptured so the conditions of the first programmable transistor 120 and the second programmable transistor 130 will no longer be related to the initial state of the self-tracked bistable latch cell 100. Furthermore, the change caused in the self-destruction operation may even alter the settling result of the cross-coupled latch 110 in the following read operations. Consequently, the self-tracked bistable latch cell 100 will lose the track of the initial state of the bits B1 and B2.

Also, in some embodiments, the self-tracked bistable latch cell 100 can be used as PUF, and the complementary pair of bits B1 and B2 can be entangled to a memory address, a piece of system data, or a bus arbitration bit for encryption, enhancing the system security.

In some embodiments, the self-tracked bistable latch cell 100 can be disposed in a memory structure with address decoders to support data access in applications.

Figure 5:
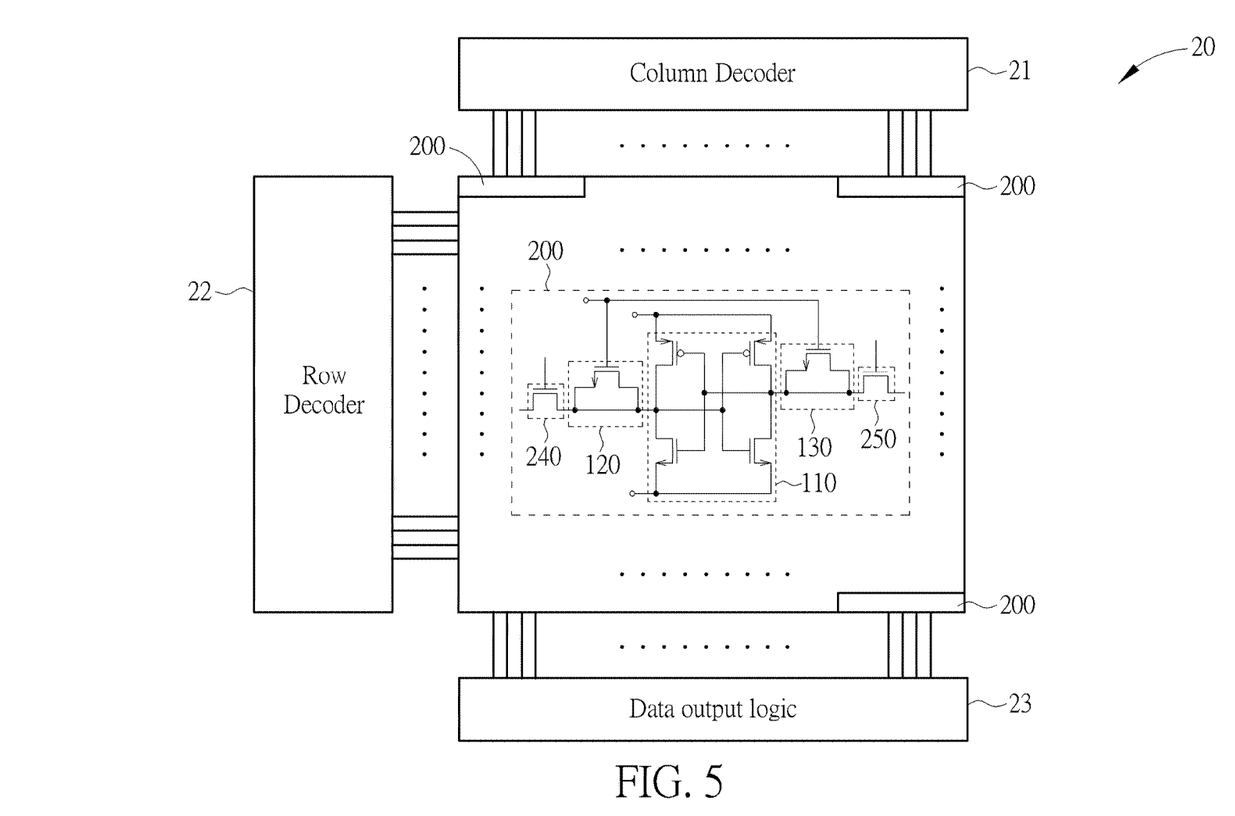
FIG. 5 shows a memory structure according to one embodiment of the present invention.

FIG. 5 shows a memory structure 20 according to one embodiment of the present invention. The memory structure 20 includes a column decoder 21, a row decoder 22, a data output logic 23, and a plurality of self-tracked bistable latch cells 200. Each self-tracked bistable latch cell 200 has a similar structure as the self-tracked bistable latch cell 100. However, the self-tracked bistable latch cell 200 further includes a first select transistor 240 and a second select transistor 250.

The first select transistor 240 has a first terminal coupled to a first bit line, a second terminal coupled to the first terminal of the first programmable transistor 120, and a control terminal coupled to a corresponding word line. The second select transistor 250 has a first terminal coupled to a second bit line, a second terminal coupled to the first terminal of the second programmable transistor 130, and a control terminal coupled to the corresponding word line.

In this case, the column decoder 21 and the row decoder 22 can decode the address and access the corresponding self-tracked bistable latch cell 200 with the corresponding word line to perform the desired operations. Also, the data output logic 23 can select the corresponding bit lines to output the read out data.

In FIG. 5, the self-tracked bistable latch cells 200 may perform the track operation and the self-destruction operation simultaneously or individually according to the system requirement. Furthermore, in some embodiments, the self-destruction operation may only be performed on parts of the self-tracked bistable latch cells 200. In this case, the goal of the self-destruction operation is to overwrite the existing bit distribution by flipping some tracking components to the opposite direction, creating a new bit map that is statistically independent to previous information stored in the self-tracked bistable latch cells 200.

However, in some other embodiments, some or all of the cell devices can be completely destroyed by performing the self-destruction operation. This could be a desirable feature for high value content systems from a system security prospective.

In addition, to further enhance the security of the self-tracked bistable latch cell, subset of PUF cells can be merged with the column decoder 21, the row decoder 22 and the data output logic 23 to randomize the seemly regular and easily recognizable memory structure 20.

For example, taking PUF configuration bits into address decoder can create a configurable addressing structure that is dependent not only on the address inputs but also a random and unpredictable PUF data pattern in the decoder circuits. Also, a subset of PUF configuration bits can be entangled with PUF data bits through some simple Boolean operations to further enhance protection to PUF data space.

Furthermore, in some embodiments, the first select transistor 240 and the second select transistor 250 may not be necessary since the first programmable transistor 120 and the second programmable transistor 130 can also be used for the word line selection. In this case, the first terminal and the second terminal of the first programmable transistor 120 are not coupled together, and the first terminal and the second terminal of the second programmable transistor 130 are not coupled together. Also, the first terminals of the programmable transistors 120 and 130 can be coupled to the first bit line and the second bit line respectively, while the second terminals of the programmable transistors 120 and 130 can be coupled data terminals 110A and 110B respectively. That is, with the control terminals of the programmable transistors 120 and 130, the word line selection can also be achieved.

Figure 6:
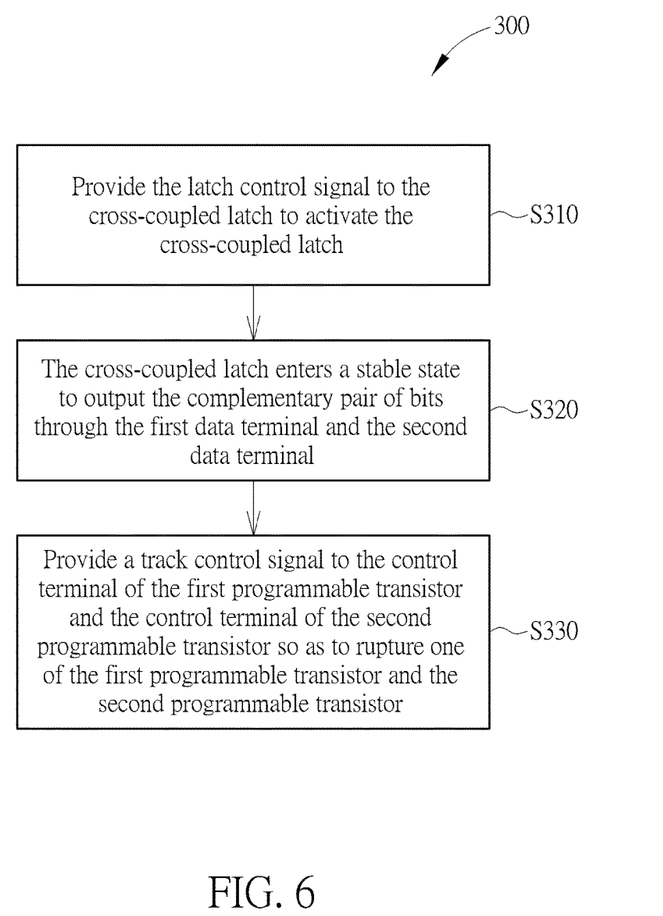
FIG. 6 shows a method for operating the self-tracked bistable latch cell in FIG. 1 or FIG. 2 during the track operation.

FIG. 6 shows a method 300 for operating the self-tracked bistable latch cell 100 or 200 during the track operation. The method 300 includes steps S310 to S330.

S310: provide the latch control signal $SIG_L$ to the cross-coupled latch 110 to activate the cross-coupled latch 110;

S320: the cross-coupled latch 110 enters a stable state to output the complementary pair of bits B1 and B2 through the first data terminal 110A and the second data terminal 110B according to natural tendency of the cross-coupled latch 110 caused by uncontrollable manufacturing processes;

S330: provide a track control signal $SIG_T$ to the control terminal of the first programmable transistor 120 and the control terminal of the second programmable transistor 130 so as to rupture one of the first programmable transistor 120 and the second programmable transistor 130 according to the complementary pair of bits B1 and B2.

In some embodiments, during the track operation, the track control signal $SIG_T$ can be at the first voltage V1 and the latch control signal $SIG_L$ can be at the second voltage V2 as shown in FIG. 2. According to method 300, since the bits B1 and B2 generated by the cross-coupled latch 110 are complementary to each other, the first programmable transistor 120 and the second programmable transistor 130 will endure different levels of voltage stress. Therefore, whichever of the first programmable transistor 120 and the second programmable transistor 130 endures larger voltage stress will be ruptured in S330, and the initial state of the self-tracked bistable latch cell 100 or 200 can be recorded.

Figure 7:
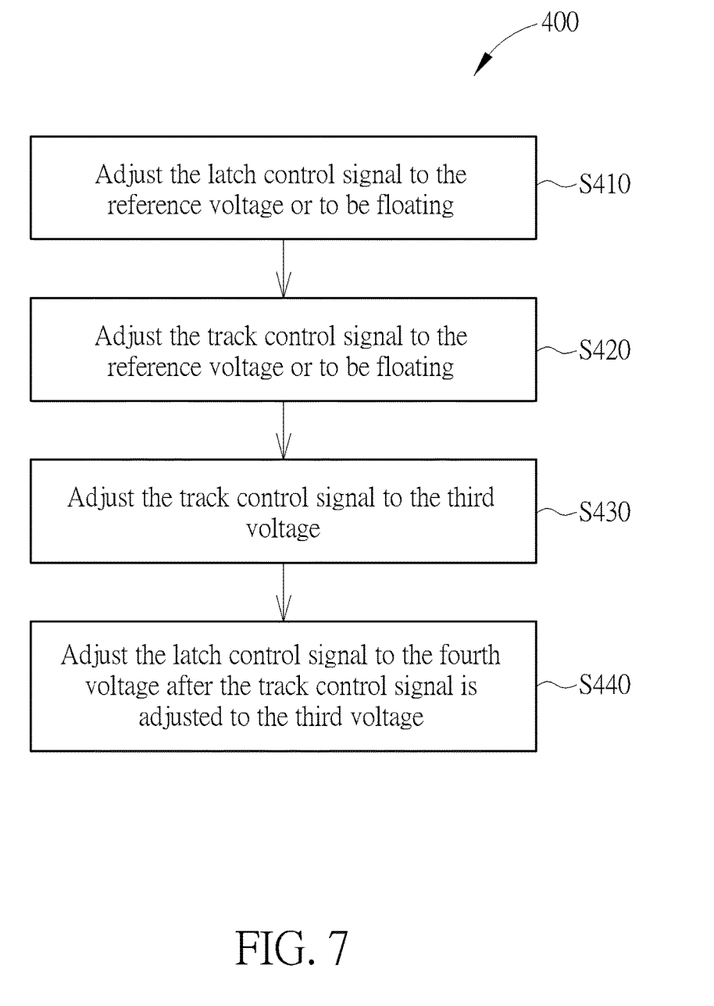
FIG. 7 shows a method for operating the self-tracked bistable latch cell in FIG. 1 or FIG. 3 during the read operation.

FIG. 7 shows a method 400 for operating the self-tracked bistable latch cell 100 or 200 during the read operation. The method 400 includes steps S410 to S440.

S410: adjust the latch control signal $SIG_L$ to the reference voltage $V_{ref}$ or to be floating;

S420: adjust the track control signal $SIG_T$ to the reference voltage $V_{ref}$ or to be floating;

S430: adjust the track control signal $SIG_T$ to the third voltage V3;

S440: adjust the latch control signal $SIG_L$ to the fourth voltage V4 after the track control signal $SIG_T$ is adjusted to the third voltage V3.

According to the method 400, by adjusting the track control signal $SIG_T$ to the third voltage V3 in step S430, the voltage differentiation between data terminals 110A and 110B can be enhanced due to the different conditions of the first programmable transistor 120 and the second programmable transistor 130. Therefore, when the latch control signal $SIG_L$ is pulled up to the fourth voltage V4 in step S440, the states of the bits B1 and B2 recorded in the self-tracked bistable latch cell 100 initially can be read out accordingly.

Also, the order shown in FIG. 7 is not to limit the present invention. For example, in some embodiments, step S410 may be performed before or after step S420 in some embodiments. Also, in some other embodiments, steps S410 and S420 can also be performed at the same time.

Figure 8:
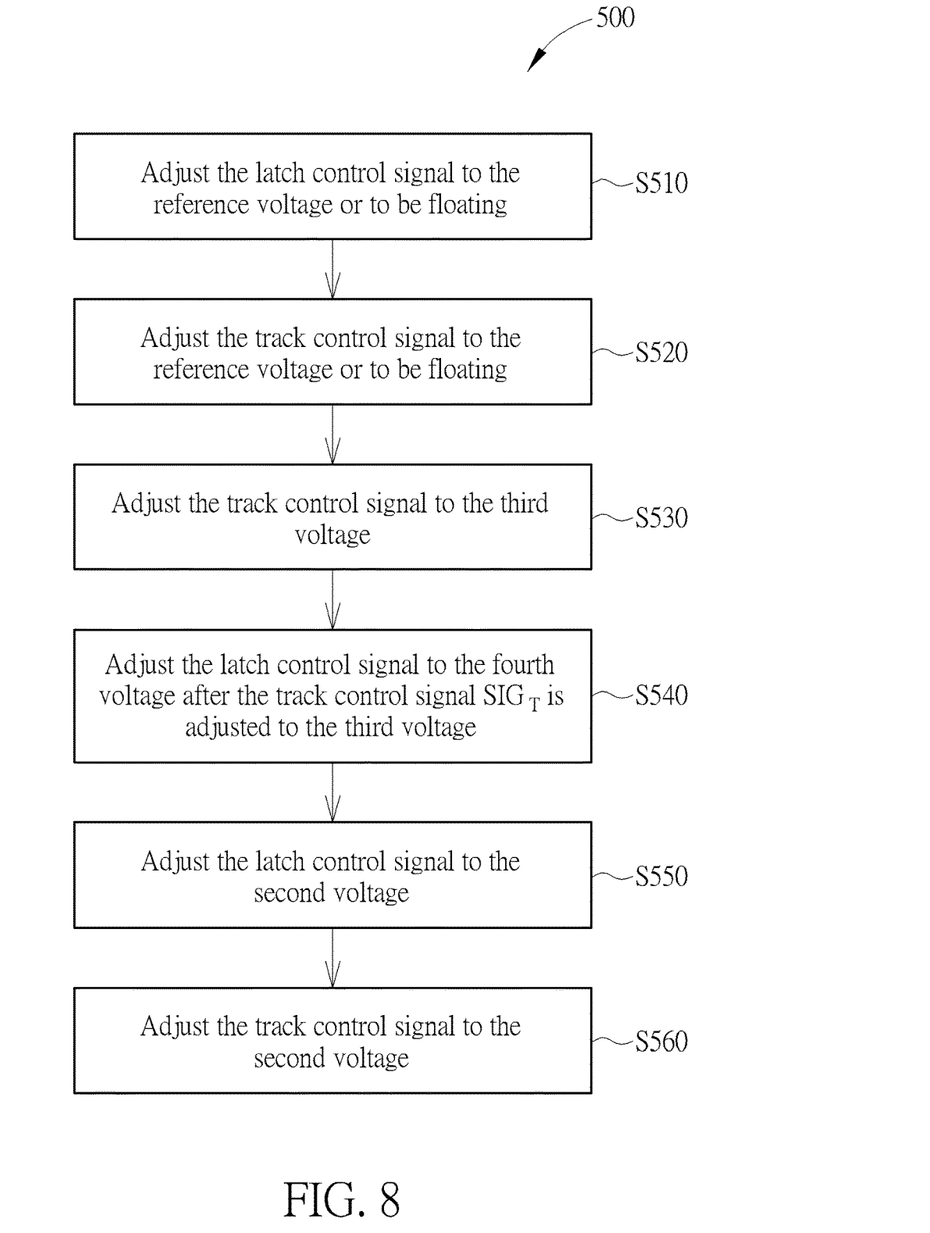
FIG. 8 shows a method for operating the self-tracked bistable latch cell in FIG. 1 or FIG. 4 during the self-destruction operation.

FIG. 8 shows a method 500 for operating the self-tracked bistable latch cell 100 or 200 during the self-destruction operation. The method 500 includes steps S510 to S560, but is not limited to the order shown in FIG. 8.

S510: adjust the latch control signal $SIG_L$ to the reference voltage $V_{ref}$ or to be floating;

S520: adjust the track control signal $SIG_T$ to the reference voltage $V_{ref}$ or to be floating;

S530: adjust the track control signal $SIG_T$ to the third voltage V3;

S540: adjust the latch control signal $SIG_L$ to the fourth voltage V4 after the track control signal $SIG_T$ is adjusted to the third voltage V3;

S550: adjust the latch control signal $SIG_L$ to the second voltage V2;

S560: adjust the track control signal $SIG_T$ to the second voltage V2.

According to the method 500, the states of the bits B1 and B2 recorded in the self-tracked bistable latch cell 100 can be read out accordingly by steps S510 to S540. However, the order shown in FIG. 8 is not to limit the present invention. For example, step S510 may be performed before or after step S520 in some embodiments. Also, in some other embodiments, steps S510 and S520 can also be performed at the same time.

Afterwards, in steps S550 and S560, the latch control signal $SIG_L$ and the track control signal $SIG_T$ are both adjusted to the second voltage V2, rupturing the programmable transistor which has not been ruptured previously. That is, after the self-destruction operation is performed, the gate oxides of the first programmable transistor 120 and the second programmable transistor 130 will both be ruptured.

In some embodiment, step S540 may not be necessary. That is, in step S550, the latch control signal $SIG_L$ can be adjusted to the second voltage V2 directly after the track control signal $SIG_T$ is adjusted to the third voltage V3. In this case, the cross-coupled latch 110 can output the complementary bits B1 and B2 settled initially with higher voltage level, and the track control signal $SIG_T$ adjusted to the second voltage V2 in step S560 will rupture the corresponding programmable transistor accordingly to remove the track of the initial state.

Also, in some embodiments, to prevent the first programmable transistor 120 and the second programmable transistor 130 from being ruptured by unexpected voltage difference, steps S550 and S560 can be performed simultaneously. Consequently, the conditions of the first programmable transistor 120 and the second programmable transistor 130 used for tracking the initial states of the self-tracked bistable latch cell 100 or 200 will no longer relate to the initial states. Since the PUF device usually contains highly sensitive information in a security system, the built-in self-destruction function can be critical when threats are induced by tampering or other unauthorized operations.

In summary, the self-tracked bistable latch cells and the method for operating the self-tracked bistable latch cells provided by the embodiments of the present invention can use the programmable transistors to track the initial state of the cross-coupled latch; therefore, the self-tracked bistable latch cell can achieve unpredictability and reproducibility for PUF implementations with insignificant overhead. Furthermore, the self-tracked bistable latch cell can also perform self-destruction to remove the track when an attack or unauthorized operation is detected, enhancing the security of the PUF system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A self-tracked bistable latch cell comprising:
    a cross-coupled latch having a first data terminal, a second data terminal, a first voltage input terminal configured to receive a latch control signal, and a second voltage input terminal configured to receive a reference voltage;
    a first programmable transistor having a first terminal configured to output a first bit during a read operation, a second terminal coupled to the first data terminal of the cross-coupled latch, and a control terminal configured to receive a track control signal, wherein a gate oxide of the first programmable transistor is thinner than a gate oxide of a transistor of the cross-coupled latch; and
    a second programmable transistor having a first terminal configured to output a second bit during the read operation, a second terminal coupled to the second data terminal of the cross-coupled latch, and a control terminal configured to receive the track control signal, wherein a gate oxide of the second programmable transistor is thinner than the gate oxide of the transistor of the cross-coupled latch.

2. The self-tracked bistable latch cell of claim 1, wherein during a track operation:
    the cross-coupled latch enters a stable state and outputs a complementary pair of bits through the first data terminal and the second data terminal according to natural tendency of the cross-coupled latch; and
    one of the first programmable transistor and the second programmable transistor is ruptured according to the complementary pair of bits.

3. The self-tracked bistable latch cell of claim 2, wherein during the track operation:
    the track control signal is at a first voltage;
    the latch control signal is at a second voltage higher than the first voltage; and
    a voltage difference between the second voltage and the first voltage is large enough to rupture the first programmable transistor and the second programmable transistor.

4. The self-tracked bistable latch cell of claim 3, wherein during the read operation:
    the latch control signal and the track control signal are at the reference voltage or floating;
    the track control signal is changed to a third voltage;
    the latch control signal is changed to a fourth voltage after the track control signal is changed to the third voltage;
    the third voltage and the fourth voltage are higher than the reference voltage.

5. The self-tracked bistable latch cell of claim 4, wherein the second voltage is higher than the third voltage and the fourth voltage.

6. The self-tracked bistable latch cell of claim 3, wherein during a self-destruction operation:
    the latch control signal and the track control signal are at the reference voltage or floating;
    the track control signal is changed to a third voltage; and
    the latch control signal and the track control signal are changed to the second voltage after the track control signal is changed to the third voltage.

7. The self-tracked bistable latch cell of claim 1, wherein the first programmable transistor and the second programmable transistor are anti-fuse transistors.

8. The self-tracked bistable latch cell of claim 1, wherein the cross-coupled latch comprises:
    a first P-type transistor having a first terminal coupled to the first voltage input terminal of the cross-coupled latch, a second terminal coupled to the first data terminal of the cross-coupled latch, and a control terminal coupled to the second data terminal of the cross-coupled latch;
    a second P-type transistor having a first terminal coupled to the first voltage input terminal of the cross-coupled latch, a second terminal coupled to the second data terminal of the cross-coupled latch, and a control terminal coupled to the first data terminal of the cross-coupled latch;
    a first N-type transistor having a first terminal coupled to the first data terminal of the cross-coupled latch, a second terminal coupled to the second voltage input terminal of the cross-coupled latch, and a control terminal coupled to the second data terminal of the cross-coupled latch; and
    a second N-type transistor having a first terminal coupled to the second data terminal of the cross-coupled latch, a second terminal coupled to the second voltage input terminal of the cross-coupled latch, and a control terminal coupled to the first data terminal of the cross-coupled latch.

9. The self-tracked bistable latch cell of claim 1, wherein:
    the self-tracked bistable latch cell is disposed in a memory structure.

10. The self-tracked bistable latch cell of claim 9, further comprising:
    a first select transistor having a first terminal coupled to a first bit line, a second terminal coupled to the first terminal of the first programmable transistor, and a control terminal coupled to a word line; and
    a second select transistor having a first terminal coupled to a second bit line, a second terminal coupled to the first terminal of the second programmable transistor, and a control terminal coupled to the word line.

11. The self-tracked bistable latch cell of claim 1, wherein at least one of the complementary pair of bits is entangled to a memory address, a piece of system data, or a bus arbitration bit for encryption.

12. A method for operating a self-tracked bistable latch cell, the self-tracked bistable latch cell comprising a cross-coupled latch, a first programmable transistor coupled to a first data terminal of the cross-coupled latch, and a second programmable transistor coupled to a second data terminal of the cross-coupled latch, the method comprising:
   during a track operation:
      providing a latch control signal to the cross-coupled latch to activate the cross-coupled latch;
      the cross-coupled latch entering a stable state to output a complementary pair of bits through the first data terminal and the second data terminal according to natural tendency of the cross-coupled latch caused by uncontrollable manufacturing processes; and
      providing a track control signal to a control terminal of the first programmable transistor and a control terminal of the second programmable transistor so as to rupture one of the first programmable transistor and the second programmable transistor according to the complementary pair of bits.

13. The method of claim 12, wherein during the track operation:
   the track control signal is at a first voltage;
   the latch control signal is at a second voltage higher than the first voltage; and
   a voltage difference between the second voltage and the first voltage is large enough to rupture the first programmable transistor and the second programmable transistor.

14. The method of claim 13, further comprising during a read operation:
   adjusting the latch control signal to a reference voltage or to be floating;
   adjusting the track control signal to the reference voltage or to be floating;
   adjusting the track control signal to a third voltage; and
   adjusting the latch control signal to a fourth voltage after the track control signal is adjusted to the third voltage;
   wherein the third voltage and the fourth voltage are higher than the reference voltage.

15. The method of claim 13, wherein the second voltage is higher than the third voltage and the fourth voltage.

16. The method of claim 13, further comprising during a self-destruction operation:
   adjusting the latch control signal being at a reference voltage or to be floating;
   adjusting the track control signal being at the reference voltage or to be floating;
   adjusting the track control signal to a third voltage;
   adjusting the latch control signal to the second voltage after the track control signal is adjusted to the third voltage; and
   adjusting the track control signal to the second voltage.

17. The method of claim 12, wherein the first programmable transistor and the second programmable transistor are anti-fuse transistors.

18. The method of claim 12, wherein the cross-coupled latch comprises:
   a first P-type transistor having a first terminal coupled to the first voltage input terminal of the cross-coupled latch, a second terminal coupled to the first data terminal of the cross-coupled latch, and a control terminal coupled to the second data terminal of the cross-coupled latch;
   a second P-type transistor having a first terminal coupled to the first voltage input terminal of the cross-coupled latch, a second terminal coupled to the second data terminal of the cross-coupled latch, and a control terminal coupled to the first data terminal of the cross-coupled latch;
   a first N-type transistor having a first terminal coupled to the first data terminal of the cross-coupled latch, a second terminal coupled to the second voltage input terminal of the cross-coupled latch, and a control terminal coupled to the second data terminal of the cross-coupled latch; and
   a second N-type transistor having a first terminal coupled to the second data terminal of the cross-coupled latch, a second terminal coupled to the second voltage input terminal of the cross-coupled latch, and a control terminal coupled to the first data terminal of the cross-coupled latch.

19. The method of claim 12, wherein the self-tracked bistable latch cell is disposed in a memory structure.

20. The method of claim 12, further comprising entangling at least one of the complementary pair of bits to a memory address, a piece of system data, or a bus arbitration bit for encryption.

* * * * *